United States Patent [19]

Ligtenberg et al.

[11] Patent Number: 5,682,441
[45] Date of Patent: Oct. 28, 1997

[54] METHOD AND FORMAT FOR STORING AND SELECTIVELY RETRIEVING IMAGE DATA

[75] Inventors: Adrianus Ligtenberg, Palo Alto; Adolf Gerard Starreveld; William John Gulland, both of Mountain View, all of Calif.

[73] Assignee: Storm Technology, Inc., Mountain View, Calif.

[21] Appl. No.: 554,384

[22] Filed: Nov. 8, 1995

[51] Int. Cl.⁶ .................................. G06K 9/36; G06K 9/46
[52] U.S. Cl. .......................... 382/232; 382/240; 382/264
[58] Field of Search .................................. 382/240, 232, 382/264

[56] References Cited

U.S. PATENT DOCUMENTS

| | | | |
|---|---|---|---|
| 4,943,855 | 7/1990 | Bheda et al. | 358/133 |
| 5,048,111 | 9/1991 | Jones et al. | 382/56 |
| 5,333,212 | 7/1994 | Ligtenberg | 382/56 |
| 5,384,869 | 1/1995 | Wilkinson et al. | 382/56 |
| 5,434,953 | 7/1995 | Bloomberg | 382/298 |

Primary Examiner—Andrew Johns
Assistant Examiner—Monica S. Davis
Attorney, Agent, or Firm—Townsend and Townsend and Crew LLP

[57] ABSTRACT

A method of processing an input image for storage includes decomposing the input image into a number of images at various resolutions, subdividing at least some of these images into tiles (rectangular arrays) and storing a block (referred to as the "tile block") representing each of the tiles, along with an index that specifies the respective locations of the tile blocks. In specific embodiments, the tiles are 64×64 pixels or 128×128 pixels. The representations of the tiles are typically compressed versions of the tiles. In a specific embodiment, JPEG compression is used. In a specific embodiment, an operand image is recursively decomposed to produce a reduced image and a set of additional (or complementary) pixel data. At the first stage, the operand image is normally the input image, and, for each subsequent stage, the operand image is the reduced image from the previous stage. At each stage, the reduced image is at a characteristic resolution that is lower than the resolution of the operand image. The processing is typically carried out until the resulting reduced image is of a desired small size.

34 Claims, 3 Drawing Sheets

METHOD AND FORMAT FOR STORING AND SELECTIVELY RETRIEVING IMAGE DATA

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to storing and retrieving image data, and more specifically to a file format that provides selective retrieval for display, printing, or communication purposes.

It is said that a picture is worth a thousand words, and history bears this out. From cave men drawing pictures on the walls of their caves to modern-day students accessing multimedia encyclopedias, people have always considered pictorial information an essential communication tool. Recent advances in computer technology have made it possible to create and exchange elaborate documents in electronic form. Text and graphics (line art) are easily formatted and manipulated, allowing an amateur computer user to create highly professional documents. The logical next step is the incorporation of photographs and other bitmap images into documents.

While the technology exists to digitize and edit photographs, a persistent problem is that bitmap images are very large. For example, an 8×10 inch color photograph scanned at 300 dpi (dots/inch) at 24 bits/pixel represents over 20 megabytes of data, and this is hardly an extreme example. Thus, in the context of a local computer, acquiring, viewing, manipulating, and printing such images are painfully slow processes, even with state-of-the-art computer equipment. The problem is aggravated when it is desired to transfer these images over a network.

Fortunately, the bitmap representation of most photographs includes a large amount of repetitive information making the images amenable to image compression schemes. An international compression standard called JPEG, which allows pictures to be stored in about 1/10 the space with high quality, has been developed and adopted. Greater levels of compression can be achieved, but the quality of the reconstructed image is lower. While it is possible to achieve lossless compression, the compression factor would only be on the order of 4x. A discussion of the JPEG compression, as well as a number of enhancements thereto, can be found in U.S. Pat. No. 5,333,212 to Ligtenberg, the entire disclosure (including appendices) of which is incorporated by reference for all purposes.

There have been developed image editing programs that incorporate virtual memory schemes specially tailored to images. In these schemes, the images are divided into tiles (rectangular image regions). The advantage of tiles is that image data can be retrieved for only those tiles that will be displayed, and operations can be performed locally.

Another problem is where an image needs to be accessed at different resolutions. For example, an image might be displayed actual size at 72 dpi but printed at 300 or 600 dpi. A solution to this problem is known as pyramid coding, such as in Kodak's PhotoCD format, where the image is stored at different resolutions. The pyramid allows the user to select an image resolution that is the most effective for a certain task. For example, to browse a number of images, one views the thumbnail images (highly reduced images that are on the order of an inch or two on a side when displayed). The basic features of the image can be discerned, and a selected image can then be retrieved at a screen resolution for viewing or at a higher print resolution suitable for printing.

Although the above solutions have been successful in addressing some of the obstacles standing in the way of using images on the computer, the solutions are not without their drawbacks. For example, JPEG compression, while it reduces the file size, does not allow selective reconstruction of a desired portion of the image. Rather, it is necessary to reconstruct all portions of the image between the top left of the image and the bottom right of the desired portion. Furthermore, while the tilebased virtual memory schemes alleviate the memory requirements, they do not reduce the file size. Additionally, an image stored in the PhotoCD format is so large that it is only used on PhotoCDs. The format is not practical as a format for on-line storage and retrieval or for storage on a local hard disk.

SUMMARY OF THE INVENTION

The present invention provides an effective and flexible image data format and techniques for selectively storing and retrieving image data. A storage format according to the invention allows desired portions of the image data to be retrieved at desired resolution.

In brief, a method of processing an input image for storage includes decomposing the input image into a number of images at various resolutions, subdividing at least some of these images into tiles (rectangular arrays) and storing a block (referred to as the "tile block") representing each of the tiles, along with an index that specifies the respective locations of the tile blocks. The representations of the tiles are typically compressed versions of the tiles. In a specific embodiment, JPEG compression is used.

In a specific embodiment, an operand image is iteratively decomposed to produce a reduced image at a lower resolution and a set of additional (or complementary) pixel data. At the first stage, the operand image is normally the input image, and, for each subsequent stage, the operand image is the reduced image from the previous stage. The additional pixel data produced at a given stage can be considered to have the same characteristic resolution as the reduced image produced at that stage. The reduced image and the additional pixel data at a given resolution are sometimes referred to as a layer.

The processing is typically carried out until the resulting reduced image is of a desired small size. This is typically a size that represents the smallest image that is useful for display. In a specific embodiment, this is an image between 80 and 160 pixels on a side, referred to as a thumbnail.

The reduction performed at each stage is of a type that retains the basic appearance of the operand image. In a specific embodiment, the reduced image is obtained by subjecting the operand image to horizontal and vertical low-pass filters followed by decimation. In a specific embodiment, the reduction is by a factor of 2 in each dimension.

The additional pixel data contains at least some of the information lost in the reduction of the operand image. This allows the operand image to be reconstructed to a desired degree by suitably combining the reduced image and the additional pixel data. If the additional pixel data allows faithful reconstruction of the operand image, the reduced images (other than the thumbnail) are redundant, and it is not necessary to store them in the file. That is, a given layer may only need to contain the additional pixel data at that layer's resolution. However, in some embodiments, the reduced images are included in the file to allow direct access and to eliminate or reduce the computational resource needed to reconstruct the reduced image.

In a specific embodiment, the additional pixel data comprises a set of complementary images, which are produced by subjecting the operand image to each of three series of filtering operations: a horizontal low-pass filter and a vertical high-pass filter; a horizontal high-pass filter and a vertical low-pass filter; and a horizontal high-pass filter and a vertical high-pass filter. Each of the three resulting filtered images is decimated.

Any desired portion of the image file, can be retrieved and reconstructed at a desired one of the resolutions that characterize the reduced images that were generated during the decomposition process. If a particular reduced image is stored in the file, its relevant tile blocks can be retrieved directly. If the final reduced image is the only reduced image actually stored in the file, the reduced image will typically need to be reconstructed. This is done, in essence, by reversing the decomposition process used to create the file.

In a specific embodiment, the relevant tile blocks of the final reduced image and of the complementary images at the final stage are retrieved, decompressed (if necessary), upsampled, and combined. This produces an expanded image that is an approximation to the reduced (operand) image that was input to the last stage of the decomposition process. The faithfulness of the reconstruction depends on the lossiness of the compression that was done on the tiles, and on the degree to which the complementary image process preserves pixel values.

This process is iterated by combining the reconstructed image with the relevant portions of the complementary images having the same resolution as the reconstructed image. The iterations stop when an image of the desired resolution is achieved. This may be the original input image, or an image at some intermediate resolution. If a lossy compression scheme is used, it is also possible to store in the file additional tiled information that represents the difference between the input image, and the reconstructed image at the input image's resolution. This information could be losslessly compressed.

The present invention also provides efficient techniques for modifying images in memory and updating the file to incorporate the modifications. When a portion of the image is retrieved from the file and brought into memory, a table is created in memory containing index information regarding the tile blocks in the file. The table includes a "valid" bit for each tile block. The valid bit is initially set to a state designating that the tile has not been modified in memory and therefore corresponds to what is currently in the file.

If a portion of the image is modified, the tile blocks that include the modified portion are marked "invalid," signifying that the mapped tiles stored in the disk file no longer correspond to what is in memory. When it is desired to save the modification, the tile blocks for the modified tiles are written to the file, preferably at the end of the file, and the index in the file is modified to reflect the new locations of the modified tile blocks.

A further understanding of the nature and advantages of the present invention may be realized by reference to the remaining portions of the specification and the drawings.

SYSTEM OVERVIEW

Figure 1:
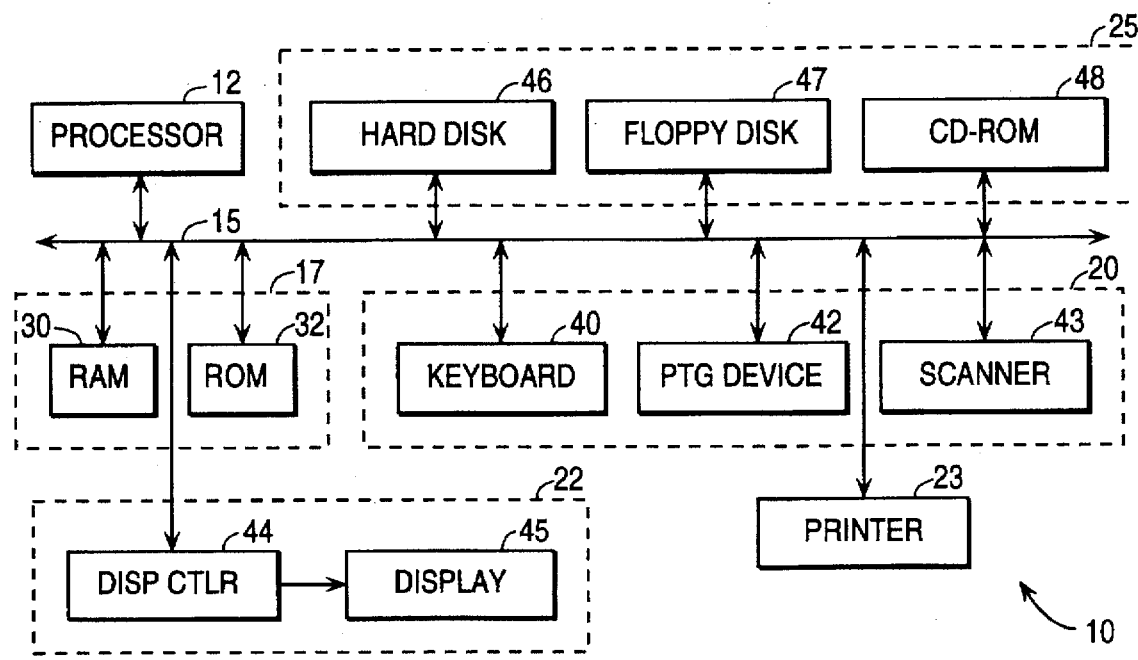
FIG. 1 is a block diagram of a system in which the present invention may be embodied.

FIG. 1 is a simplified block diagram of a computer system 10 in which the present invention may be embodied. The computer system configuration illustrated at this high level is standard, and as such, FIG. 1 is labeled "Prior Art". A computer system such as system 10, suitably programmed to embody the present invention, however, is not prior art. The specific embodiments of the invention are embodied in a general purpose computer system such as shown in FIG. 1, and the remaining description will generally assume that environment. However, the invention may be embodied in dedicated photo input and output devices such as digital cameras, set-top boxes, and printers.

In accordance with known practice, the computer system includes a processor 12 that communicates with a number of peripheral devices via a bus subsystem 15. These peripheral devices typically include a memory subsystem 17, a user input facility 20, a display subsystem 22, output devices such as a printer 23, and a file storage system 25.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 15 is shown schematically as a single bus, but a typical system has a number of buses such as a local bus and one or more expansion buses (e.g., ADB, SCSI, ISA, EISA, MCA, NuSus, or PCI), as well as serial and parallel ports. Network connections are usually established through a device such as a network adapter on one of these expansion buses or a modem on a serial port. The computer system may be a desktop system or a portable system.

Memory subsystem 17 includes a number of memories including a main random access memory (RAM) 30 and a read only memory (ROM) 32 in which fixed instructions are stored. In the case of Macintosh-compatible personal computers this would include portions of the operating system; in the case of IBM-compatible personal computers, this would include the BIOS (basic input/output system).

User input facility 20 typically includes a keyboard 40 and may further include a pointing device 42 and a scanner 43. The pointing device may be an indirect pointing device such as a mouse, trackball, touchpad, or graphics tablet, or a direct pointing device such as a touchscreen incorporated into the display.

Display subsystem 22 typically includes a display controller 44 and a display device 45 coupled to the controller. The display device may be a cathode ray tube (CRT), a flat-panel device such as a liquid crystal display (LCD), or a projection device. Display controller provides control signals to the display device and normally includes a display memory (not shown in the figure) for storing the pixels that appear on the display device.

The file storage system provides persistent (non-volatile) storage for program and data files, and typically includes at least one hard disk drive 46 and at least one floppy disk drive 47. There may also be other devices such as a CD-ROM drive 48 and optical drives. Additionally, the system may include hard drives of the type with removable media cartridges. As noted above, one or more of the drives may be located at a remote location, such as in a server on a local area network or at a site on the Internet's World Wide Web.

File Creation and Format

Figure 2:
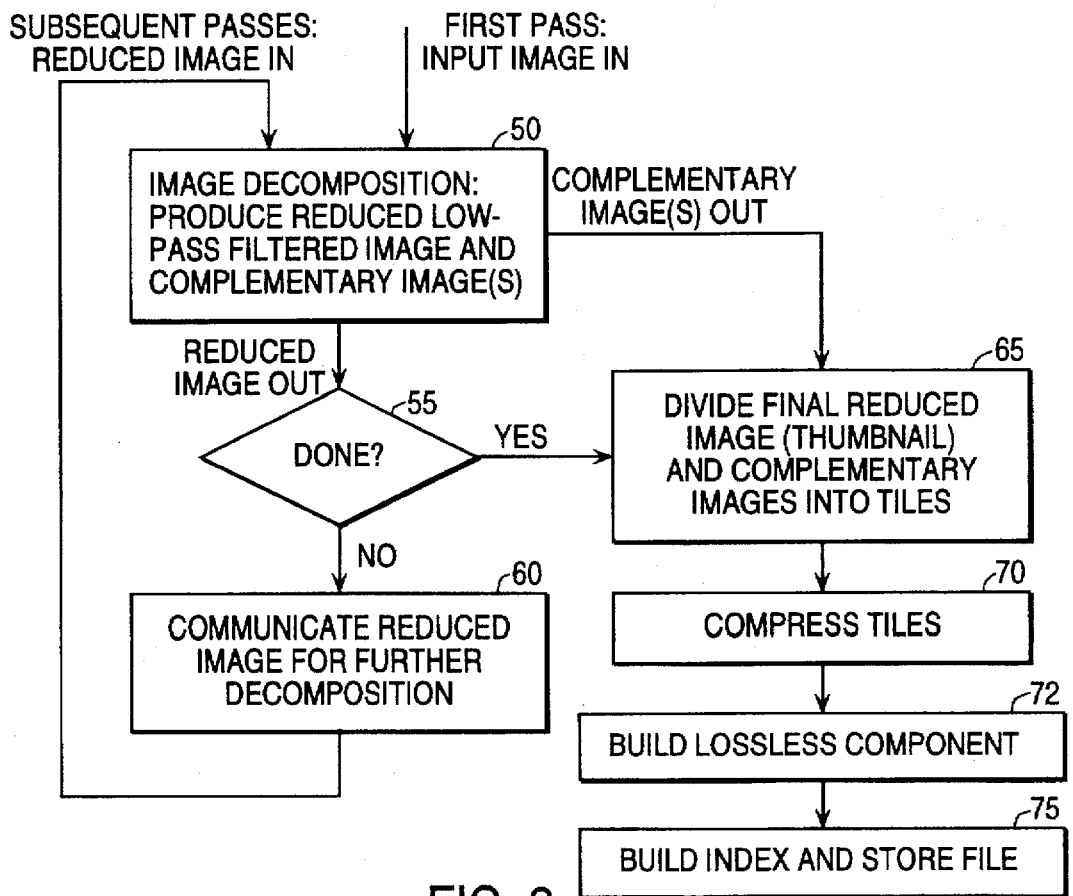
FIG. 2 is a high-level flow diagram showing the conversion of an input image to a file according to the present invention.

FIG. 2 is an overall flow diagram showing the conversion of an input image to a file having the file format according to an embodiment of the present invention. The file format stores sufficient information to allow access to desired portions of an original bitmap input image at a variety of resolutions, depending on the task at hand. The file format is referred to as an active file format since the user can interact with the file and the file provides what the user needs.

In the specific embodiment described below, the file is constructed with a view to eliminating redundant information so as to produce a smaller file. The trade-off is that it is necessary to reconstruct the image at a given resolution on the basis of information retrieved from the file.

The process of constructing the file is iterative in the sense that in a first pass the input image is subjected to an image decomposition stage 50, and in subsequent passes, a portion of the data resulting from stage 50 is again input to stage 50. The input image to stage 50 is referred to generically as the operand image. The operation of stage 50 is to produce a reduced image at a lower resolution than the operand image, and additional image components containing a desired level of the information that was discarded in producing the reduced image. These additional image components are referred to as additional pixel data or as the "complementary images". In a specific embodiment, the operations in stage 50 include filtering and decimation by a factor of two.

The reduced image and complementary images produced at each stage have a characteristic resolution and can be thought of as a layer of the image. In the specific embodiment, the reduced image is not stored as part of the file since it can be reconstructed from information in subsequently generated layers.

When the operand image has been processed, resulting in a reduced image and complementary images, the complementary images are output from stage 50 for further processing and storage as will be described below. The system tests (step 55) whether there is need for another iteration. The method can be iterated any desired number of times, but in a specific embodiment, the test is whether the reduced image has a size below a threshold, which in the specific embodiment is that each dimension of the reduced image be between 80 and 160 pixels. Clearly, the necessary number of iterations can be readily determined ahead of time from the size of the input image.

If the reduced image is not sufficiently small, the reduced image is communicated to stage 50 as the operand image (step 60). If the reduced image is sufficiently small, further processing by stage 50 is not required. At this point, the reduced image, referred to as the "final reduced image" or the "thumbnail" is output for further processing and storage along with the complementary images, which were output at each stage.

The thumbnail and the complementary images (and the other reduced images if they are to be stored as part of the file) are divided into tiles (step 65) to allow subsequent retrieval and reconstruction of desired portions of the image at desired resolutions. The individual tiles are compressed (step 70), although compression is not a necessary part of the invention. Compression, if it is used, is one possible mechanism that can cause loss of information. Although there are lossless compression techniques, the specific embodiment uses JPEG compression, which is a lossy technique.

Another possible source of information loss is the processing within stage 50. The reduced image output from stage 50, by definition, contains only a portion of the operand image that was input to stage 50. The degree to which the operand image can be reconstructed depends on the nature of the complementary image generation. The complementary images may contain all the information to allow such reconstruction if desired, but there may be some applications where there is no need to reconstruct any of the intermediate resolution images losslessly. It may, however, be desired to be able to reconstruct the original input image losslessly.

If it is required to provide lossless reconstruction, the compressed tiles are subjected to processing (step 72) to build a lossless component for storage in the file. This may entail reconstruction of the image at full resolution, subtraction from the original input image, and generation of data representing the difference image. The latter would be tiled and losslessly compressed.

The file comprises individual blocks for each of the tiles produced at tiling step 65, as well as an index to all these blocks. If compression is used, the block would store the compressed data produced at compression step 70. These blocks are sometimes referred to as "tile blocks". If step 72 is performed, the index would also refer to the lossless information component. The construction of the index and storing of the file is shown as step 75, performed after all the processing described above.

As mentioned above, the file includes an index that contains the locations (offsets in file) of all the tile blocks. In embodiments where each tile is compressed, the tile blocks are of unequal length, and so it is also necessary to store the length of each tile block as well as the tile block's offset in the file. The lengths of the tile blocks can be stored in the index or as part of the tile blocks themselves. Where compression is not used, or where a compression regime that compresses to a fixed size is used (see, for example, the above mentioned U.S. Pat. No. 5,333,212), the tile blocks are all of equal length in a given layer, and there is no need to store the individual lengths of the tile blocks. If, as in some alternative embodiments, it is desired to store one or more of the intermediate reduced images themselves, the index would need to store the locations of the tile blocks for these reduced images.

The choice of tile size is subject to a number of design considerations. Since a given image is unlikely to have dimensions that are exact multiples of the tile dimension, smaller tiles will reduce wasted storage of blank space along the bottom and right edges of the image. Further, since users will generally be unaware of tile boundaries when specifying regions for reconstruction, smaller tiles will reduce the amount of unwanted image portions that are reconstructed. On the other hand, larger tiles reduce the number of I/O operations for retrieval and storage. Larger tiles also result in a smaller index, which is not a major issue for storage, but can be significant for memory since the entire index is likely to be in memory.

In general, the number of pixels on a side should be a power of 2 for ease in computing and associating corresponding tiles in different layers (assuming a 2×reduction at each stage), and square tiles are generally preferred. There is no fundamental reason why the tile size should be the same for all layers, and in some embodiments it may be advantageous to have the tiles progressively smaller so that a single tile in one layer will correspond to a single (smaller) tile in the next reduced layer. Furthermore, a particular size may optimize I/O or memory operations for a frequently used layer. However in most of the discussion that follows, a fixed tile size will be assumed. In a current implementation, a tile size of 128×128 pixels is used, but a tile size of 64×64 pixels is another likely choice.

Depending on the tile size and the number of stages of reduction, the reduced image and its complementary images at some stage (for example, the thumbnail stage) may fit within a single tile. In such a case, reference to dividing a particular image into tiles should be interpreted to include the possibility that the image has been sufficiently reduced so that it fits within a single tile. The benefits of tiling will be realized, however, as long as at least some of the layers are divided into a plurality of tiles.

The above description of the method of processing operand images in terms of producing a number of resulting images, tiling and compressing the resulting images, building the index of tile blocks, and storing the file accurately represents the operations that are performed. It should be realized, however, that this is a high-level view of the method. In actual implementations, the steps are likely to be subdivided and interleaved, producing compressed tiles and corresponding index information incrementally as processing proceeds.

One possible approach is to process portions of the input image to completion before processing other portions. For example, if there are to be two levels of reduction, 16 tiles of the input image map to a single tile of the thumbnail and each group of 16 tiles would be processed fully as follows. In the first stage, each of four subgroups of four tiles from the input image produces a single reduced tile and three complementary tiles, the latter of which can be compressed, indexed, and stored immediately. The four tiles of the reduced image produce a single tile of the thumbnail and three complementary tiles, all of which can be compressed, indexed, and stored immediately. At this point, the compressed tiles from the two stages of processing can be used to reconstruct 16 tiles at the resolution of the input image, and the lossless component for the 16 input tiles can be constructed, compressed losslessly, indexed, and stored.

Figure 3:
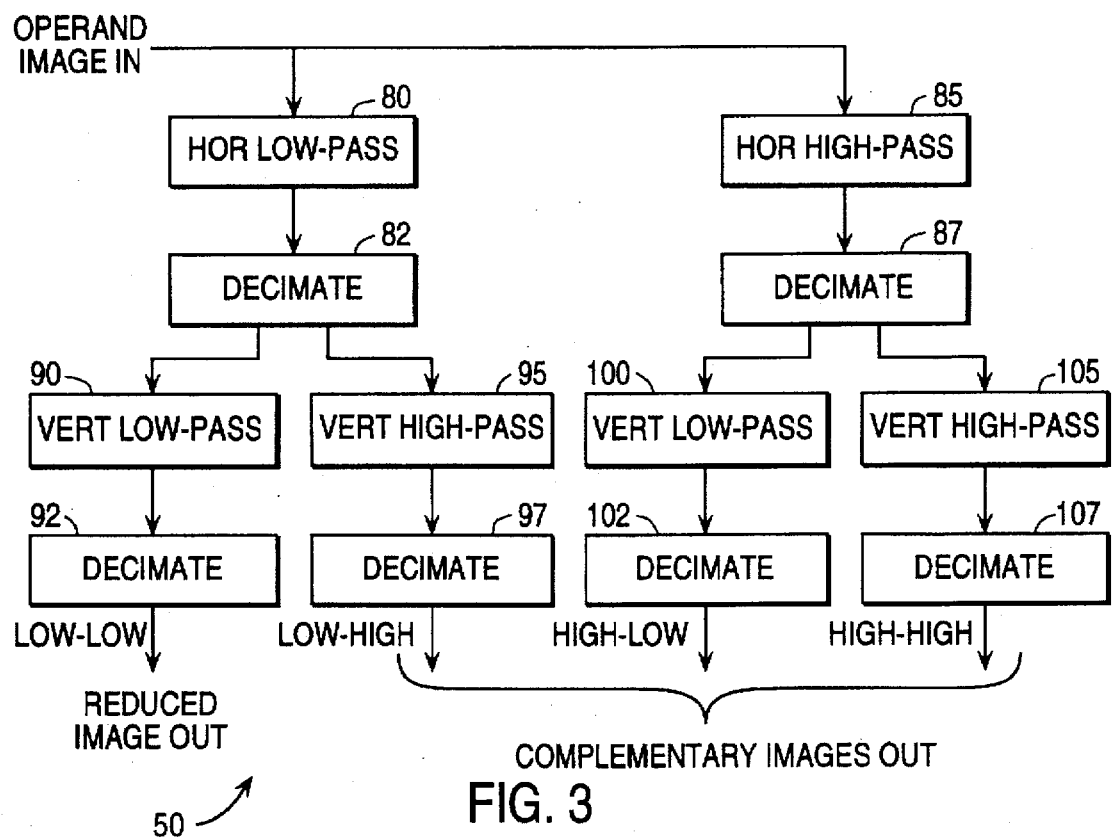
FIG. 3 is an expanded flow diagram illustrating steps iteratively performed during image decomposition.

FIG. 3 is an expanded flow diagram illustrating steps performed in a specific embodiment of image decomposition stage 50. In brief, the reduced image and the three complementary images are obtained by subjecting the operand image to four combinations of filtering and decimation operations. The technique, outlined below, is described for use in a different context in U.S. Pat. No. 4,943,855 to Bheda et al., the entire disclosure of which is incorporated by reference for all purposes.

In the specific embodiment, the operand image is subjected to a horizontal low-pass filter applied to each row (step 80) followed by a decimation of every other column (step 82), to produce a first intermediate image. The operand image is separately subjected to a horizontal high-pass filter applied to each row (step 85) followed by a decimation of every other column (step 87), to produce a second intermediate image. Each intermediate image is then subjected separately to two additional sets of operations. In the specific embodiment, the filters are finite impulse response (FIR) filters. For example, the low-pass filters may have coefficients (1, 1) or (1, 3, 3, 1) while the high-pass filters may have coefficients (1, −1) or (1, 3, −3, −1)

The first intermediate image is subjected to a vertical low-pass filter applied to each column (step 90) followed by a decimation of every other row (step 92), to produce the reduced image, also referred to as the low-low image. The first intermediate image is separately subjected to a vertical high-pass filter applied to each column (step 95) followed by a decimation of every other row (step 97), to produce a first complementary image, also referred to as the low-high image.

The second intermediate image is subjected to a vertical low-pass filter applied to each column (step 100) followed by a decimation of every other row (step 102), to produce a second complementary image, also referred to as the high-low image. The second intermediate image is separately subjected to a vertical high-pass filter applied to each column (step 105) followed by a decimation of every other row (step 107), to produce a third complementary image, also referred to as the high-high image.

Image Reconstruction

Figure 4:
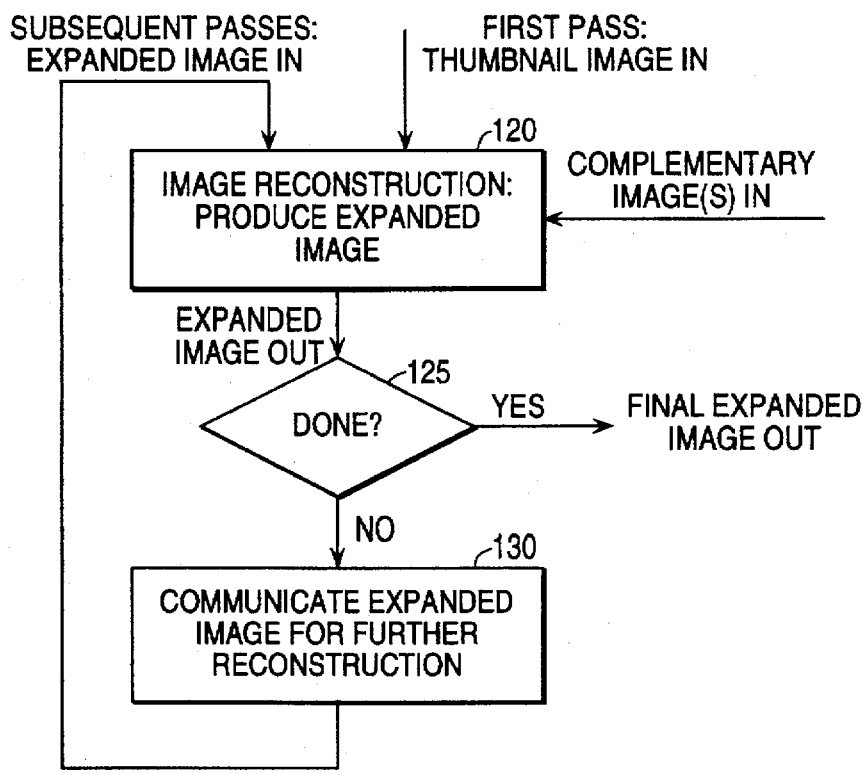
FIG. 4 is a is a high-level flow diagram showing the retrieval and reconstruction of an image stored in a file according to the present invention.

FIG. 4 is an overall flow diagram showing the retrieval and reconstruction of an image from a file having the file format described above. Since the thumbnail and the complementary images at each stage in the image decomposition were tiled, it is possible to selectively reconstruct a desired portion of the image. While the discussion that follows will typically refer to retrieving a particular image, it should be understood that it is only necessary to retrieve the tile blocks and reconstruct the tiles corresponding to the desired portion of the image.

The reconstruction process is, in large part, a reverse of the decomposition process described above. Again, the process is iterative. In a first pass the thumbnail image and its complementary images are retrieved, decompressed (if previously compressed), and subjected to an image expansion and reconstruction stage 120; in subsequent passes, the expanded image resulting from stage 120 is again input to stage 120, along with the retrieved complementary images that had been generated from the image at the next higher level of resolution. The thumbnail image and the expanded image from the previous stage that is again input to stage 120 are referred to generically as the operand image. The operation of stage 120 is to produce an expanded image at a higher resolution than that of the operand image and its complementary images. In a specific embodiment, the operations in stage 120 include interpolation, filtering, and combination of the operand images.

When the operand image and complementary images have been processed, resulting in an expanded image, the system tests (step 125) whether there is need for another iteration. The method can be iterated any desired number of times up to the maximum resolution, namely that of the original input image.

If the expanded image is not yet at the desired resolution, the expanded image is communicated to stage 120 as the operand image (step 130) along with its complementary images. If the expanded image is at the desired resolution, further processing by stage 120 is not required. At this point, the expanded image, referred to as the final expanded image is output for its intended use.

The above description was in terms of retrieving and reconstructing the image from the file. As mentioned, this entails retrieving the thumbnail and various of the complementary images into memory and, if the tile representations are compressed, decompressing them before operating on them. It should be noted that it is not always necessary to start from the thumbnail. If the desired portion of the image is already in memory at some resolution, either having been reconstructed or directly retrieved, that image can be considered the operand image, which can be expanded and combined with its complementary images. For embodiments where the intermediate reduced images are not stored, the portion that was already in memory is most likely to have been reconstructed starting with the thumbnail and its complementary images.

Figure 5:
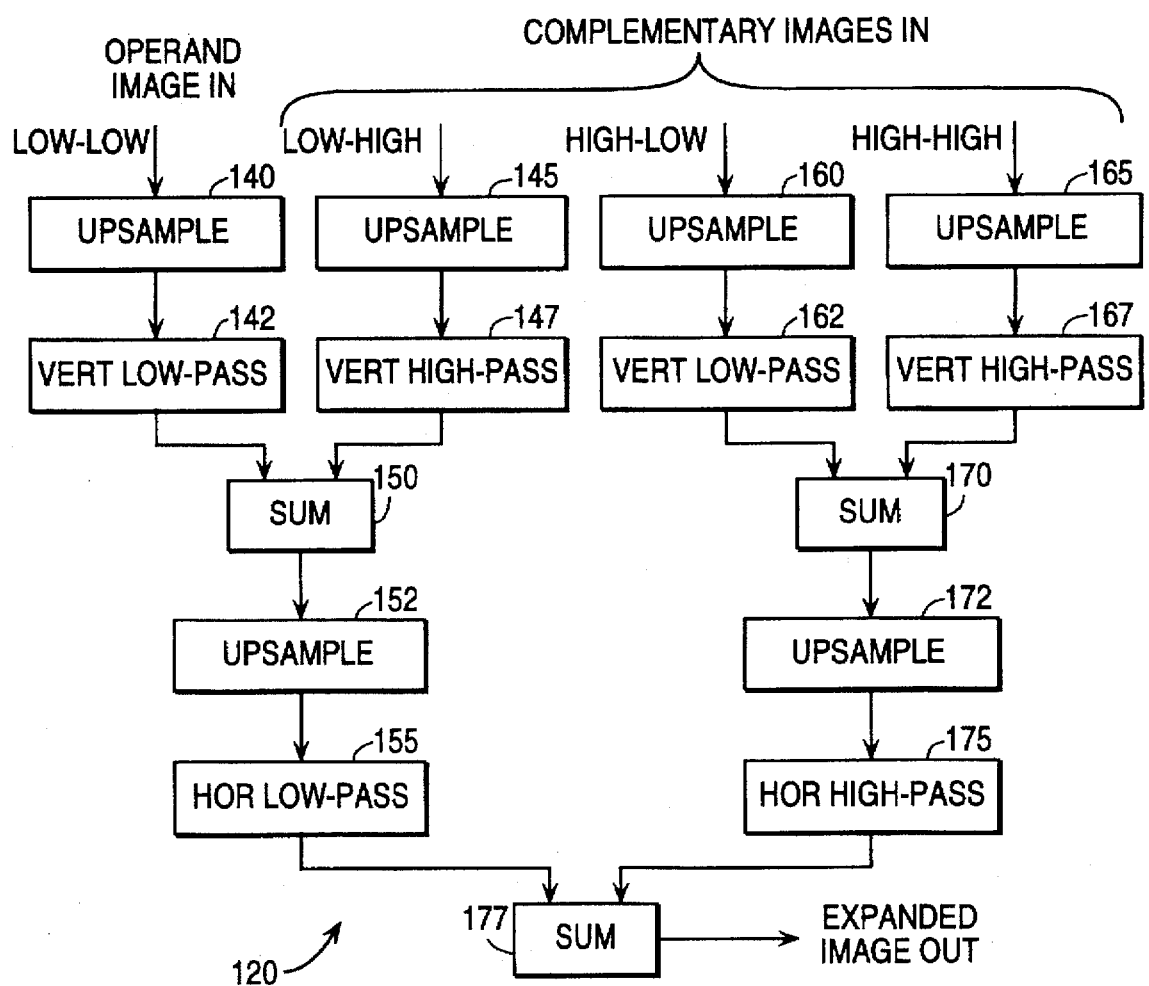
FIG. 5 is an expanded flow diagram illustrating steps iteratively performed during image reconstruction.

FIG. 5 is an expanded flow diagram illustrating steps performed in a specific embodiment of image reconstruction stage 120. This embodiment assumes a specific decomposition as shown in FIG. 3. In brief, the expanded image is obtained by subjecting the operand image and the three complementary images to four combinations of upsampling, filtering, and summing operations. The technique, outlined below, is also described in the above-mentioned U.S. Pat. No. 4,943,855.

In the specific embodiment, the operand image is vertically upsampled (step 140) and each column is subjected to a vertical low-pass filter (step 142) to produce a first intermediate image. The low-high image is vertically upsampled (step 145) and each column is subjected to a vertical high-pass filter (step 147) to produce a second intermediate image. The first and second intermediate images are then summed (step 150) to produce a third intermediate image. The third intermediate image is horizontally upsampled (step 152) and each row is subjected to a horizontal low-pass filter (step 155) to produce a fourth intermediate image.

The high-low image is vertically upsampled (step 160) and each column is subjected to a vertical low-pass filter (step 162) to produce a fifth intermediate image. The high-high image is vertically upsampled (step 165) and each column is subjected to a vertical high-pass filter (step 167) to produce a sixth intermediate image. The fifth and sixth intermediate images are then summed (step 170) to produce a seventh intermediate image. The seventh intermediate image is horizontally upsampled (step 172) and each row is subjected to a horizontal high-pass filter to produce an eighth intermediate image.

The fourth and eighth intermediate images are summed (step 177) to provide the expanded image that serves as the operand image for the next stage, if further iterations are needed. In the specific embodiment, the filters are finite impulse response (FIR) filters. For example, the low-pass filters may have coefficients (1, 1) or (1, −3, −3, 1) while the high-pass filters may have coefficients (−1, 1) or (−1, 3, 3, 1), assuming decomposition with the specific filters discussed above.

Retrieval at Increased Resolution

As described above, with reference to FIGS. 4 and 5, retrieving the image at a given resolution entails iteratively combining the operand image with complementary images. While these operations are being carried out in memory, it is not necessary to delay displaying the image. As soon as an image at a given resolution is available, it can be expanded to a size suitable for display using an interpolation such as a cubic spline, and the interpolated values can be sent to the display memory. This provides a display at full size, albeit lower true resolution, without waiting to retrieve the complementary images from a disk.

Once the complementary images have been retrieved from the disk and properly incorporated into the image, the expanded image has the true resolution for its size. If this size is suitable for display, the image can be copied to the display memory. Otherwise, it can be expanded and interpolated as above before overwriting the previous interpolated image in display memory. Since the newly displayed interpolated image includes the complementary images from the last iteration, it represents an improvement over the previously interpolated image. Thus a fuzzy version of the image (the interpolated thumbnail) initially appears on the screen, and sharpens as additional data are retrieved from the disk file and incorporated into the image.

In-Memory Operations and File Saves

The description of creating and storing a file, as illustrated in FIG. 2, was in terms of starting with an image and iteratively decomposing the image into layers, each including a reduced image and complementary images. While all the complementary images are stored, only the final reduced image is stored. When the image is retrieved and brought into memory at a given resolution, it is only necessary to retrieve the index and the relevant tile blocks to create the appropriate data structures in memory.

If the image is to be modified, the modifications must be performed on the image at full resolution, even though the image is being displayed at a lower resolution. If it is desired to save the modifications, the tile blocks that include the modified portions must be rewritten to the disk file. In order to make the process more efficient, the data structure corresponding to the index of tile blocks is defined to include a "valid" bit for each tile block. If a portion of the image is modified, the tile blocks that include the modified portion are marked "invalid," signifying that the mapped tiles stored in the disk file no longer correspond to what is in memory. When it is desired to save the changes, the changed tile blocks are decomposed as described above with reference to FIG. 2.

In a specific embodiment, the newly calculated tile blocks are stored at the end of the file, and the offsets and lengths for these tile blocks, as stored in the index, are updated to reflect the fact that these tile blocks are now in new locations in the file and are of different lengths. The old versions of these tile blocks remain in the file, but the index contains no pointers to them. This allows the data to be saved without having to rebuild the file on every save operation.

This has the advantage of speed, and further does not overwrite data during the save operation. Thus, it is potentially safer in the event of a computer malfunction. On the other hand, this embodiment wastes disk space. This can be addressed by rebuilding the file in response to a command. Alternatively, the problem of wasted disk space can be alleviated by keeping track in memory of these empty spaces, and writing a tile block to the end of the file only if there are no empty spaces large enough to accommodate the tile block to be written. For safety, the tile block's old location, even if large enough, could be reserved until after the tile block has been safely written at a new location.

Memory is typically a scarce resource when dealing with large images. For performance reasons, when retrieving tile blocks from the file it is preferred to maintain the compressed data in memory where possible. Additionally, the index in memory may advantageously store additional information about the location of the tile blocks, such as whether they are in memory.

Specific File Format

Appendix A contains a listing of a source file Aff.h, written in the C computer language, showing a representative active file format according to the invention. While the source code is commented and is relatively self-explanatory, a few comments are in order. The so-called Magic number allows operating system utilities to quickly identify file contents, but has no additional significance to the file format. The version field allows future expanded definition for the active file format.

The directory is stored at an offset rather than directly after the file header so that a new directory can be written at the end of file and be made active by only overwriting the directory offset in the header, rather than having to overwrite the old directory. As currently defined, fColorSpace in AFF.h is only exemplary, and illustrates only a few of the myriad of possible color spaces.

As can be seen, the actual filter coefficients are stored, providing extra flexibility. The fReserved fields are for future expansion as well as to make sure that the structs are powers of 2 in size so that index computations are efficient.

The basic iterative process for reconstructing an image to a desired resolution was described with reference to FIG. 4. The following discussion describes the method with specific reference to the Appendix. The steps outlined below are typical for reconstructing a given desired layer (resolution level of the image):

1) Read header and check if correct.
2) Extract directory offset from header and seek to that position.
3) Read fixed size AFFFileDirectory structure.
4) Set i=0.
5) Find data for the thumbnail by accessing its LayerImage description found at offset AFFFileDirectory.fLayers[0].
6) Load an operand buffer with the thumbnail image from its tiles found through information in the current LayerImage.fIndexOffset[kLLIndex].
7) Use the information in the current LayerImage to locate the LH, HL and HH images. Combine this data with the image in the operand buffer and the given filter coefficients (in the current LayerImage) to reconstruct in an output buffer the image data for the next (i+1) layer.
8) Increment i by 1.
9) If i=desired layer go to step 11.
10) Find data for the next LayerImage at offset AFFFileDirectory.fLayers[i] and read this data to make it the current LayerImage. Make the output buffer the operand buffer and go to step 7.
11) Done.

Conclussion

In summary, it can be seen that the present invention provides elegant and powerful techniques for managing bitmap images. The active file format of the present invention provides random-access reading and writing (at the tile level), and can supply pixels at any resolution or color space. By allowing selective retrieval at the resolution needed for output (print or display), the invention consumes CPU and I/O resources that are proportional only to the data needed, not to the size of the original input image. Thus the user can trade speed for image quality at will, while retaining the ability to retrieve the image at maximum resolution. This is significant, since it makes it possible to download only the thumbnail and thus browse images over a modem.

While the above is a complete description of specific embodiments of the invention, various modifications, alternative constructions, and equivalents may be used. Therefore, the above description should not be taken as limiting the scope of the invention as defined by the claims.

APPENDIX A

FILE FORMAT

```
#ifndef __AFF_H
#define __AFF_H
/************************************************************ *
 * File:             AFF.h
 *
 * Function:         Definitions for Active File Format.
 *
 * Author(s):        Dolf Starreveld (ds)
 *
 * Copyright:        Copyright (c) 1992-1995 Storm Software, Inc.
 *                   All Rights Reserved.
 *
 * Source:           Original.
 *
 * Notes:
 *
 * Review History:
 *
 * Change History:
 *
 * 95_10_22_ds       Added this header.
 *
 ************************************************************/
/* Some supporting type definitions */
typedef signed      short SInt16;
typedef unsigned    short UInt16;
typedef signed      long SInt32;
typedef unsigned    long UInt32;
typedef UInt32      FileOffset;   /* Offset into file */
typedef UInt32      DataLength;   /* Length of data in file */
typedef SInt32      Fixed16;      /* Fixed point with 16 bits fraction */
#define AFF_MAGIC    0x41464630   /* 'AFF0' */
#define AFF_VERSION  0x0100       /* Version 1.0.0 */
/*
 * This header is always found at the start of each AFF file.
 */
typedef struct {
    UInt32     fMagic;            /* Magic number */
    UInt16     fVersion;          /* AFF version used for this file */
    UInt16     fFiller;           /* Unused */
    FileOffset fDirOffset;        /* Offset to current directory */
    UInt32     fReserved[1];      /* Reserved for future expansion */
} AFFHeader;
/* This AFF directory provides information about the image as well
 * as information needed to locate all sub-components needed to
 * reconstruct the image at a desired resolution.
 * In this struct, dimensions and resolution refer to the original
 * image (in other words the largest reconstructable image).
 * This struct is really of variable length because the fLayers array is
 * really of a size determined by fNumLayers.
 * fLLLayer contains the offset to the LayerImage structure for the
 * lossless completion layer, if present. Otherwise it must be 0.
 */
typedef struct {
    UInt32     fWidth;            /* Width in pixels */
    UInt32     fHeight;           /* Height in pixels */
    Fixed16    fHRes;             /* Horizontal resolution in ppi */
    Fixed16    fVRes;             /* Vertical resolution in ppi */
    UInt8      fColorSpace;       /* Image's color space */
    UInt16     fNumLayers;        /* Number of reconstruction layers */
    FileOffset fLLLayer;          /* Offset to lossless layer
                                     (LayerImage)*/
    FileOffset fLayers[1];        /* Offset to layer(s) (LayerImage) */
```

APPENDIX A-continued

FILE FORMAT

```c
} AFFFileDirectory;
/* The following color spaces are exemplary */
enum {
    kColorGray8 = 1,        /* 8-bit grayscale */
    kColorGray12,           /* 12-bit grayscale */
    kColorRGB8,             /* 8-bit RGB */
    kColorRGB12,            /* 12-bit RGB */
    kColorCMYK8,            /* 8-bit CMYK */
    /* etc. */
}
/* Every layer in the file format has four sub-images:
 * LL (low-low), LH (low-high), HL (high-low), and HH (high-high)
 * images. Typically, the LL image is not present, because it can be
 * reconstructed from the previous layer. In some cases, however, there
 * may be a benefit to having this image available directly and so it
 * might be present in the file. For the final stage thumbnail image
 * this sub-image is always present.
 * If the image is not present, its fIndexOffset field must be 0.
 */
enum {                      /* Possible indices for fIndexOffset */
    kLLIndex = 0,
    kLHIndex,
    kHLIndex,
    kHHIndex
};
enum {                      /* Values for fCompression */
    kCompNone = 0,          /* No compression */
    KJPEG                   /* JPEG compression */
    /* Up to 256 compression methods can be defined here */
};
typedef struct {
    UInt32      fWidth;         /* Width in pixels */
    UInt32      fHeight;        /* Height in pixels */
    UInt16      fTileSize;      /* Tile size in pixels */
    UInt16      fTilesPerRow;   /* Number of tiles horizontally */
    UInt8       fCompression;   /* Compression method used */
    UInt8       fFilterSize;    /* # of coefficients in filters */
    SInt16      fLowPass[8];    /* Coefficients for low-pass filter */
    SInt16      fHighPass[8];   /* Coefficients for high-pass filter */
    UInt8       fReserved[2];   /* Currently unused */
    FileOffset  fIndexOffset[4];/* Offset to tile index arrays */
} LayerImage;
/* In the LayerImage struct, each fIndexOffset points to a location in the,
 * file where the tile index is stored for an image. At that location there
 * will be an array of TileIndexEntry structs (see below). This array will
 * be a one dimensional array with a number of entries equal to:
 * fTilesPerRow * ((fHeight + fTileSize - 1) / fTileSize) *
 * numComponents
 * numComponents is the number of image components as implied by the
 * fColorSpace of the image, e.g. for an RGB image it will be 3.
 *
 * The index is addressed by a one dimension index that is computed as a
 * function of:
 * - image component
 * - pixel coordinate (h & v)
 *
 * The index first stores all entries for the first row of tiles for the
 * first image component (i.e. image components are stored in a planar
 * model). Next come subsequent rows of tiles for that component.
 * Next comes the first row of tiles for the second color component etc.
 *
 * Consequently the baseIndex for a plane is computed:
 *     baseIndex[comp] = comp * (fTilesPerRow * tilesPerColumn)
 *
 * To find the index entry for a tile that contains a given point in the
 * image, use the Point2TileIndex macro below to compute the index
 * within the plane and add that to the baseIndex for the desired
 * component.
 */
typedef struct {
    FileOffset  fOffset;    /* Offset to tile data */
    DataLength  fSize;      /* Size of data for this tile */
} TileIndexEntry;
#define Point2TileIndex(h,v,lip) (((h) / (lip)->fTileSize) + \
                ((v) / (lip)->fTileSize) * (lip)->fTilesPerRow)
#endif /* __AFF_H */
```

What is claimed is:

1. A method of converting a bitmap input image into an image storage format, the method comprising the steps of:

(a) at each of a plurality of stages including a first stage and a last stage, processing an operand image to produce a reduced image and a set of additional pixel data;

(b) in the first stage, using the input image as the operand image;

(c) in each stage but the first stage, using the reduced image produced in the previous stage as the operand image, the reduced image produced by the last stage being referred to as the final reduced image;

the processing at each stage including the steps of:

(i) subjecting the operand image to a low-pass reduction operation to provide the reduced image, the reduced image including low-frequency information from the operand image and having fewer pixels than the operand image; and (ii) subjecting the operand image to at least one operation that is different from the low-pass operation to generate the set of additional pixel data so that the reduced image and the set of additional pixel data are sufficient to reconstruct the operand image to a desired degree of accuracy;

(d) subdividing the final reduced image into tiles;

(e) subdividing each of the sets of additional pixel data into tiles; and (f) creating the image storage format, the image storage format comprising a first collection of representations of each of the tiles of the final reduced image, a second collection of representations of each of the tiles of each of the sets of additional pixel data from the plurality of stages, and an index that enables determination of the respective locations of the representations in the first collection and the respective locations of the representations in the second collection.

2. The method of claim 1, and further comprising the steps of:

subdividing a particular reduced image produced in at least one stage other than the last stage into tiles; and including representations of each of the tiles of the particular reduced image in the image storage format.

3. The method of claim 1 wherein:

the reduced image at any given stage has half as many pixels in each dimension as the operand image communicated to the given stage; and the set of additional pixel data at the given stage includes three pixel arrays commensurate in size with the reduced image at the given stage.

4. The method of claim 1 wherein the representation of each of the tiles of the final reduced image is a compressed version of the tile.

5. The method of claim 4 wherein each of the tiles of the final reduced image is compressed by JPEG compression.

6. The method of claim 1 wherein the representation of each of the tiles of each of the sets of additional pixel data is a compressed version of the tile.

7. The method of claim 6 wherein each of the tiles of each of the sets of additional pixel data is compressed by JPEG compression.

8. The method of claim 1, wherein the representation of at least one tile is a version of the tile that has been compressed by a lossy compression technique, and further comprising the steps of:

(g) reconstructing the input image using the final reduced image and the sets of additional pixel data to provide a lossy reconstructed input image;

(h) comparing the lossy reconstructed input image with the input image;

(i) determining an incremental image that, when combined with the lossy reconstructed input image, provides the input image substantially without loss;

(j) compressing the incremental image; and (k) including the compressed incremental image as part of the image storage format.

9. The method of claim 1, wherein said step of subjecting the operand image to a low-pass reduction operation comprises the steps of:

subjecting the operand image to a low-pass filter in a first direction followed by decimation to provide a first resultant image; and subjecting the first resultant image to a second low-pass filter in a second direction perpendicular to the first direction followed by decimation to provide the reduced image.

10. A method of manipulating a bitmap image in a memory of a computer, the image being divided into tiles, the image being available in the form of an image storage format, said image storage format comprising separable information for each tile and an index specifying the location of the separable information for each of the tiles in the image, said separable information for each tile being sufficient to reconstruct the pixel data of said each tile, the method comprising the steps of:

(a) loading the index from the image storage format into the memory to create an in-memory version of the index;

(b) creating a data structure in the memory, the data structure having an entry for each tile in the image, the entry for each tile including a valid bit, the valid bits of all tiles initially having a first state;

(c) loading into the memory at least a portion of the image storage format, said portion corresponding to a selected plurality of tiles;

(d) converting the loaded portion of the image storage format to pixel representations of the selected plurality of tiles;

(e) in response to user input specifying the modification of one or more particular tiles in the image, setting the valid bit of each of said one or more particular tiles to a second state different from the first state; and (f) in response to signals specifying a save operation, determining from the data structure those tiles for which the valid bit is in the second state, and for each such tile for which the valid bit is in the second state, (i) converting the pixel representation for said such tile to separable information of said such tile, (ii) updating the image storage format to include the separable information of said such tile, (iii) updating the in-memory version of the index to reflect the new location for the separable information of said such tile, and (iv) updating the index in the image storage format to reflect the new location for the separable information of said such tile.

11. The method of claim 10 wherein:

the separable information for a given tile includes sufficient information to enable the given tile to be reconstructed at any resolution of a plurality of resolutions.

12. The method of claim 11 wherein:

the separable file information for the given tile includes a thumbnail version of the given tile and one or more high-pass filtered complementary images of the given tile, said complementary images being at different resolutions of said plurality of resolutions so that the given tile can be reconstructed at said any resolution by combining the thumbnail version and at least a selected one of the complementary images.

13. The method of claim 10 wherein the data structure is a table.

14. The method of claim 10 wherein:

said image is stored in a file formatted in said image storage format;

said step (a) retrieves the index from the file;

said step (c) retrieves said at least a portion of the image storage format from the file;

said step (f)(ii) stores the separable information to the file; and said step (f)(iv) updates the index in the file.

15. The method of claim 13 wherein said step (f)(ii) stores the separable information to the end of the file.

16. The method of claim 1 wherein the tiles in the sets of additional pixel data are all the same size.

17. The method of claim 1 wherein the tiles in at least one of the sets of additional pixel data are a different size from the tiles in another one of the sets of additional pixel data.

18. The method of claim 1 wherein:

the reduced image at any given stage has half as many pixels in each dimension as the operand image communicated to the given stage; and the tiles for the set of additional pixel data in the given stage have half as many pixels in each dimension as the tiles for the set of additional pixel data associated with the operand image communicated to the given stage.

19. The method of claim 1, wherein said step of subjecting the operand image to at least one operation that is different from the low-pass reduction operation comprises the steps of:

subjecting the operand image to a low-pass filter in a first direction followed by decimation to provide a first resultant image; and subjecting the first resultant image to a high-pass filter in a second direction perpendicular to the first direction followed by decimation to provide a portion of the set of additional pixel data.

20. A method of retrieving, at a desired resolution, a desired portion of a bitmap image stored in an image storage format, the image storage format including (i) representations of tiles of the image at a first resolution that is lower than the desired resolution, (ii) additional pixel data of tiles of the image at the first resolution and at all resolutions higher than the first resolution and lower than the desired resolution, and (iii) an index for determining the location of representations of tiles of the image and the location of additional pixel data of tiles of the image, the representations of tiles and the additional pixel data at a particular resolution being sufficient to generate representations of the tiles at a new resolution that is higher than said particular resolution, the method comprising the steps of:

(a) accessing the index to determine locations of representations of tiles of the image at the first resolution, which tiles correspond to the desired portion of the bitmap image;

(b) accessing the index to determine locations of additional pixel data of said tiles corresponding to the desired portion of the bitmap image, the additional data being at the first resolution;

(c) retrieving the representations of tiles from locations determined in said step (a);

(d) retrieving the additional pixel data from locations determined in said step (b);

(e) combining the representations of tiles retrieved in said step (c) with the additional pixel data retrieved in said step (d) to generate the desired portion of the image at a second resolution that is higher than the first resolution; and (f) if the second resolution is lower than the desired resolution, repeating said steps (b), (d), and (e) with the second resolution being treated as the first resolution.

21. A method of retrieving, at a desired resolution, a desired portion of a bitmap image stored in an image storage format, the method comprising the steps of:

(a) determining whether the image storage format contains the image at the desired resolution;

(b) if so,
  (i) accessing a particular portion of the image storage format to determine the locations of representations of tiles of the image at the desired resolution, and
  (ii) retrieving the representations of tiles of the image at the desired resolution, which tiles correspond to the desired portion of the bitmap image; and (c) if not,
  (i) accessing the particular portion of the image storage format to determine locations of representations of tiles of the image at a first resolution that is lower than the desired resolution, which tiles correspond to the desired portion of the bitmap image,
  (ii) accessing the particular portion of the image storage format to determine locations of additional pixel data at the first resolution,
  (iii) retrieving the representations of tiles from locations determined in said step (c)(i),
  (iv) retrieving the additional pixel data from locations determined in said step (c)(ii),
  (v) combining the representations of tiles retrieved in said step (c)(iii) with the additional pixel data retrieved in said step (c)(iv) to generate the desired portion of the image at a second resolution that is higher than the first resolution, and
  (vi) if the second resolution is lower than the desired resolution, repeating said steps c(ii), c(iv), and c(v) with the second resolution being treated as the first resolution.

22. The method of claim 21 wherein said determining step includes accessing a designated portion of the image storage format that indicates which resolutions of the image are stored.

23. The method of claim 21 wherein the additional pixel data are representations of tiles of complementary images at the resolution that is lower than the desired resolution.

24. A method of converting a bitmap input image into an image storage format, the method comprising the steps of:

(a) at each of a plurality of stages including a first stage and a last stage, processing an operand image to produce a reduced image and a set of additional pixel data;

(b) in the first stage, using the input image as the operand image;

(c) in each stage but the first stage, using the reduced image produced in the previous stage as the operand image, the reduced image produced by the last stage being referred to as the final reduced image;

the processing at each stage including the steps of:
  (i) subjecting the operand image to a reduction operation to provide the reduced image, the reduced image including low-frequency information from the operand image and having fewer pixels than the operand image; and
  (ii) subjecting the operand image to at least one operation that is different from the reduction operation to generate the set of additional pixel data so that the reduced image and the set of additional pixel data are sufficient to reconstruct the operand image to a desired degree of accuracy;

(d) subdividing at least some of the sets of additional pixel data into tiles; and (e) creating the image storage format, the image storage format comprising a representation of the final reduced image, a collection of representations of each of the tiles of each of the sets of additional pixel data from the plurality of stages, and an index that enables determination of the respective locations of the representation of the final reduced image and the respective locations of the representations in the collection.

25. The method of claim 24, and further comprising the steps of:

subdividing a particular reduced image produced in at least one stage other than the last stage into tiles; and including representations of each of the tiles of the particular reduced image in the image storage format.

26. The method of claim 24 wherein:

the reduced image at any given stage has half as many pixels in each dimension as the operand image communicated to the given stage; and the set of additional pixel data at the given stage includes three pixel arrays commensurate in size with the reduced image at the given stage.

27. The method of claim 24 wherein the representation of each of the tiles of the final reduced image is a compressed version of the tile.

28. The method of claim 24 wherein the representation of each of the tiles of each of the sets of additional pixel data is a compressed version of the tile.

29. The method of claim 24, wherein the representation of at least one tile is a version of the tile that has been compressed by a lossy compression technique, and further comprising the steps of:

reconstructing the input image using the final reduced image and the sets of additional pixel data to provide a lossy reconstructed input image;

comparing the lossy reconstructed input image with the input image;

determining an incremental image that, when combined with the lossy reconstructed input image, provides the input image substantially without loss;

compressing the incremental image; and including the compressed incremental image as part of the image storage format.

30. A method of manipulating a bitmap image in a memory of a computer, the image being divided into tiles, the image being available in the form of an image storage format, said image storage format comprising separable information for each tile and an index enabling determination of the location of the separable information for each of the tiles in the image, said separable information for each tile being sufficient to reconstruct the pixel data of said each tile, the method comprising the steps of:

(a) loading the index from the image storage format into the memory to create an in-memory version of the index;

(b) creating a data structure in the memory, the data structure having an entry for each tile in the image, the entry for each tile including a valid bit, the valid bits of all tiles initially having a first state;

(c) loading into the memory at least a portion of the image storage format, said portion corresponding to a selected plurality of tiles;

(d) in response to user input specifying the modification of one or more particular tiles in the image, setting the valid bit of each of said one or more particular tiles to a second state different from the first state; and (e) in response to signals specifying a save operation, determining from the data structure those tiles for which the valid bit is in the second state, and for each such tile for which the valid bit is in the second state,
  (i) updating the image storage format to include the separable information of said such tile,
  (ii) updating the in-memory version of the index to reflect the new location for the separable information of said such tile, and
  (iii) updating the index in the image storage format to reflect the new location for the separable information of said such tile.

31. The method of claim 30 wherein:

the separable information for a given tile includes sufficient information to enable the given tile to be reconstructed at any resolution of a plurality of resolutions.

32. The method of claim 31 wherein:

the separable file information for the given tile includes a thumbnail version of the given tile and one or more high-pass filtered complementary images of the given tile, said complementary images being at different resolutions of said plurality of resolutions so that the given tile can be reconstructed at said any resolution by combining the thumbnail version and at least a selected one of the complementary images.

33. The method of claim 30 wherein the data structure is a table.

34. The method of claim 30 wherein:

said image is stored in a file formatted in said image storage format;

said step (a) retrieves the index from the file;

said step (c) retrieves said at least a portion of the image storage format from the file;

said step (e)(i) stores the separable information to the file; and said step (e)(iii) updates the index in the file.

* * * * *